US012673479B2

(12) United States Patent (10) Patent No.: US 12,673,479 B2
Fahy et al. (45) Date of Patent: Jul. 7, 2026

(54) METHOD AND APPARATUS FOR FORMING GLASS LAMINATES COMPRISING PLIES WITH OFFSET EDGES

(71) Applicant: Corning Incorporated, Corning, NY (US)

(72) Inventors: Kiyomi DeLige Fahy, Corning, NY (US); Evan Gray Kister, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 115 days.

(21) Appl. No.: 18/543,253

(22) Filed: Dec. 18, 2023

(65) Prior Publication Data

US 2024/0208187 A1 Jun. 27, 2024

Related U.S. Application Data

(60) Provisional application No. 63/434,279, filed on Dec. 21, 2022.

(51) Int. Cl.
B32B 17/10 (2006.01)
B32B 1/00 (2024.01)
(Continued)

(52) U.S. Cl.
CPC .......... B32B 17/10834 (2013.01); B32B 1/00 (2013.01); B32B 17/10036 (2013.01);
(Continued)

(58) Field of Classification Search
CPC ........ B32B 17/10807; B32B 17/10036; B32B 17/10302; B32B 17/10293; B32B 17/10834; H05B 3/58
See application file for complete search history.

(56) References Cited

U.S. PATENT DOCUMENTS 4,832,782 A * 5/1989 Angell .................... B32B 43/00
156/286
10,125,044 B2 11/2018 Gross et al.
(Continued)

FOREIGN PATENT DOCUMENTS

WO 2021/116984 A1 6/2021
WO 2022/125422 A1 6/2022

OTHER PUBLICATIONS

Partial European Search Report, EP application No. 23218169.3, dated May 24, 2024, 13 pages, European Patent office.

Primary Examiner — Michael A Tolin
Assistant Examiner — Hana C Page
(74) Attorney, Agent, or Firm — Daniel J. Greenhalgh

(57) ABSTRACT

Methods and apparatuses for fabricating glass laminates where there is a substantial offset between edges of glass plies of the laminates are described herein. The method includes placing an entirety of the periphery of a stack of the glass plies in a vacuum ring comprising a vacuum channel with a depth that circumferentially varies. The vacuum ring includes at least a first portion where the vacuum channel has a first depth and a second portion where the vacuum channel has a second depth that is at least two times greater than the first depth to accommodate edge offsets. Negative pressure can be applied to a space between the plies via the vacuum ring to deair the space. A suitable furnace can be used to bond the plies together and form a laminate having a desired shape.

11 Claims, 9 Drawing Sheets

(51) Int. Cl.
    *C03B 23/035*     (2006.01)
    *C03C 27/10*     (2006.01)

(52) U.S. Cl.
    CPC .. *B32B 17/10871* (2013.01); *B32B 17/10935*
        (2013.01); *C03B 23/0357* (2013.01); *C03C*
        *27/10* (2013.01); *B32B 2250/03* (2013.01);
        *B32B 2250/40* (2013.01); *B32B 2315/08*
        (2013.01); *B32B 2605/08* (2013.01)

(56)            References Cited

U.S. PATENT DOCUMENTS

| | | | |
|---|---|---|---|
| 10,821,708 B2 * | 11/2020 | Labrot | B32B 17/1077 |
| 11,028,007 B2 | 6/2021 | Gross et al. | |
| 2004/0016738 A1 * | 1/2004 | Bartrug | H05B 3/84 |
| | | | 219/203 |
| 2015/0122406 A1 * | 5/2015 | Fisher | B32B 17/10743 |
| | | | 156/222 |
| 2020/0376816 A1 * | 12/2020 | Lücke | B32B 37/182 |
| 2021/0221103 A1 | 7/2021 | Pilz et al. | |
| 2022/0184926 A1 | 6/2022 | Cleary et al. | |
| 2023/0302772 A1 * | 9/2023 | Mannheim Astete | |
| | | | B32B 17/061 |

\* cited by examiner

METHOD AND APPARATUS FOR FORMING GLASS LAMINATES COMPRISING PLIES WITH OFFSET EDGES

CROSS-REFERENCE TO RELATED APPLICATIONS

This application claims the benefit of priority under 35 U.S.C. § 119 of U.S. Provisional Application Ser. No. 63/434,279 filed on Dec. 21, 2022, the content of which is relied upon and incorporated herein by reference in its entirety.

BACKGROUND

Glass laminates are used in a number of different applications, including, for example, automotive glazings and architectural applications. In such applications, it may be desirable to form the laminates of glass plies that differ from one another in size such that there is a significant offset between edges of the glass plies. Such edge offsets can render certain existing lamination processes unsuitable, such as deairing. Certain existing deairing techniques include securing a vacuum ring around peripheries of the glass plies and applying negative pressure to the vacuum ring to remove air from between the glass plies and facilitate bonding via a polymer interlayer. Existing vacuum rings can apply a vacuum locally between the glass plies and are compatible with lehrs used in conventional lamination processes. However, existing vacuum rings may not be able to provide an adequate seal around the stack to facilitate effective deairing when there is a significant offset between edges of the glass plies.

Accordingly, there is a need for an assembly for deairing that is capable of accommodating glass sheets having different sizes.

SUMMARY

The disclosure provides, among other things, apparatuses and methods for laminating a second glass ply to a first glass ply, wherein the second glass ply comprises an edge that is offset from and disposed inward of an edge of the first glass ply. The method includes inserting an entire periphery of a stack of the first glass ply and the second glass ply into a vacuum channel of a vacuum ring. The vacuum ring comprises a first portion designed to accommodate portions of the periphery where minor surfaces of the first and second glass plies are in relative alignment and a second portion designed to accommodate portions of the periphery where the minor surfaces are significantly out of alignment (e.g., where the edge of the first glass ply is disposed outward of the edge of the second glass ply by a distance of 10 mm or more, a distance of 20 mm or more, a distance of 30 mm or more, a distance of 50 mm or more, a distance of 100 mm or more, a distance of 150 mm or more, a distance of 250 mm or more, or even a distance of 300 mm or more) with one another. The vacuum channel comprises a depth that circumferentially varies to form a pouch designed to accommodate an extending portion of the first glass ply that is not covered by the second glass ply in the stack. Once the entire periphery of the stack is contained in the vacuum channel, negative pressure is applied thereto to remove air from the vacuum channel and force the second glass ply into conformity with the first glass ply. A mechanical force may be applied to press the glass plies into one another to facilitate complete deairing of a space between the glass plies. Once the deairing is complete, the stack is heated in a suitable furnace (e.g., a lehr) to adhere the glass plies to one another and secure the second glass ply in a bent state in conformity with the first glass ply.

An aspect (1) of the present disclosure pertains to a process for fabricating a glass laminate, the process comprising: positioning a second glass substrate onto a first glass substrate with a polymeric material between the first glass substrate and the second glass substrate to form a stack, wherein the first glass substrate comprises a greater surface area than the second glass substrate such that the first substrate comprises an extending portion that is not covered by the second glass substrate and an edge of the first glass substrate is offset from an edge of the second glass substrate by a distance that is greater than or equal to 10 mm; inserting an entirety of a periphery of the stack into a vacuum channel of a vacuum ring, wherein the vacuum ring comprises a first portion where the vacuum channel has a first depth and a second portion where the vacuum channel has a second depth that is greater than or equal to twice the first depth, wherein an entirety of the extending portion is contained in the second portion of the vacuum ring; applying negative pressure to the vacuum channel; and heating the stack to above a softening temperature of the polymer material to bond the first glass substrate to the second glass substrate such that the second glass substrate is retained in a bent shape by the first glass substrate and the polymer material.

An aspect (2) of the present disclosure pertains to a process according to the aspect (1), wherein the distance that the edge of the first glass substrate is offset from the edge of the second glass substrate varies as a function of position within the stack.

An aspect (3) of the present disclosure pertains to a process according to any of the aspects (1)-(2), wherein the distance comprises a maximum value that is greater than or equal to 100 mm.

An aspect (4) of the present disclosure pertains to a process according to the aspect (3), wherein the second depth is greater than or equal to 100 mm.

An aspect (5) of the present disclosure pertains to a process according to any of the aspects (1)-(4), wherein, within the second portion, the second depth has a constant value.

An aspect (6) of the present disclosure pertains to a process according to any of the aspects (1)-(5), wherein: the periphery comprises an aligned portion where three edges of the second glass substrate are aligned with three corresponding edges of the first glass substrate, and the first portion of the vacuum ring encapsulates an entirety of the aligned portion of the periphery.

An aspect (7) of the present disclosure pertains to a process according to any of the aspects (1)-(6), wherein the vacuum channel comprises a constant width measured in a direction perpendicular to the depth.

An aspect (8) of the present disclosure pertains to a process according to the aspect (7), wherein the constant width is less than or equal to a total thickness of the glass laminate.

An aspect (9) of the present disclosure pertains to a process according to any of the aspects (1)-(8), further comprising applying a force to the stack to press the first glass substrate against the second glass substrate, wherein applying the force comprises contacting the second glass substrate with a pressing member to press the second glass substrate against the first glass substrate.

An aspect (10) of the present disclosure pertains to a process according to any of the aspects (1)-(9), wherein the extending portion comprises one or more openings.

An aspect (11) of the present disclosure pertains to a process according to any of the aspects (1)-(10), wherein the first glass substrate is curved, and, when the stack is formed, the second glass substrate comprises a minimum radius of curvature that is greater than that of the first glass substrate, wherein applying the negative pressure causes the second glass substrate to bend.

An aspect (12) of the present disclosure pertains to a process according to any of the aspects (1)-(11), wherein the first glass substrate comprises a thickness that is more than twice a thickness of the second glass substrate.

An aspect (13) of the present disclosure pertains to a process according to any of the aspects (1)-(12), wherein the glass laminate is a side window for a vehicle.

An aspect (14) of the present disclosure pertains to a process for fabricating a glass laminate, the process comprising: positioning a second glass substrate onto a first glass substrate with a polymeric material between the first glass substrate and the second glass substrate to form a stack, wherein the first glass substrate comprises a greater surface area than the second glass substrate such that the stack comprises a first region where an extending portion of the first glass substrate extends beyond an edge of the second glass substrate by a distance that is greater than or equal to 50 mm and a second region where edges of the first and second glass substrates are aligned; inserting an entirety of a periphery of the stack into a vacuum channel of a vacuum ring, wherein the vacuum channel comprises a depth that circumferentially varies such that the vacuum ring comprises a first portion where the depth is less than 10 mm and a second portion where the depth is greater than or equal to 50 mm, wherein a periphery of the second region is contained in the first portion and an edge of the first region is contained in the second portion; applying negative pressure to the vacuum channel; and heating the stack to above a softening temperature of the polymer material to bond the first glass substrate to the second glass substrate such that, the second glass substrate is retained in a bent shape by the first glass substrate and the polymer material.

An aspect (15) of the present disclosure pertains to a process according to the aspect (14), wherein the edge of the first region does not extend parallel to the edge of the second glass substrate such that the distance varies as a function of position within the first region.

An aspect (16) of the present disclosure pertains to a process according to any of the aspects (14)-(15), wherein the distance comprises a maximum value that is greater than or equal to 100 mm and, within the second portion, the depth comprises a maximum value that is greater than or equal to 100 mm.

An aspect (17) of the present disclosure pertains to a process according to any of the aspects (14)-(16), wherein, within the second portion, the depth has a constant value.

An aspect (18) of the present disclosure pertains to a process according to any of the aspects (14)-(17), wherein the vacuum channel comprises a constant width that is less than or equal to a total thickness of the glass laminate.

An aspect (19) of the present disclosure pertains to a process according to any of the aspects (14)-(18), further comprising applying a force to the second glass substrate to bend the second glass substrate into conformity with the major surface of the first glass substrate, wherein applying the force comprises contacting the second glass substrate with a pressing member to press the second glass substrate against the first glass substrate.

An aspect (20) of the present disclosure pertains to a process according to any of the aspects (14)-(19), wherein: the extending portion comprises one or more openings, the first glass substrate comprises a complex curvature, the first glass substrate comprises a thickness that is more than twice a thickness of the second glass substrate, and the glass laminate is a side window for a vehicle.

An aspect (21) of the present disclosure pertains to an apparatus comprising a vacuum ring comprising: a base; a pair of side walls extending from the base in spaced relation to one another to form a vacuum channel, wherein: the vacuum ring forms a continuous loop that circumferentially surrounds an opening for inserting a stack of glass substrates therein, wherein: the side walls vary in length such that the vacuum channel comprises a depth that circumferentially varies along the continuous loop, over a first segment of the continuous loop, the depth is less than or equal to 10 mm, and over a second segment of the continuous loop, the depth is greater than or equal to 10 mm; and a vacuum port extending from the vacuum ring and in fluid communication with the vacuum channel.

An aspect (22) of the present disclosure pertains to an apparatus according to the aspect (21), wherein the side walls comprise wall portions extending from the base and sealing portions at ends of the wall portions, wherein the sealing portions extend inward from the wall portions such that a width of the vacuum channel is decreased adjacent to the sealing portions.

An aspect (23) of the present disclosure pertains to an apparatus according to any of the aspects (21)-(22), wherein the vacuum ring comprises a first side, a second side extending from an end of the first side to form a first corner, a third side extending from an end of the second side to form a second corner, and a fourth side extending from the third side to form a third corner, wherein: the fourth side connects the third corner to the first side to form a fourth corner, the first segment comprises the first, second, and third sides, and the second segment comprises the fourth side and extends an entirety of a distance from the third corner to the fourth corner.

An aspect (24) of the present disclosure pertains to an apparatus according to any of the aspects (21)-(23), wherein an entirety of the vacuum ring is formed from a single material.

An aspect (25) of the present disclosure pertains to an apparatus according to the aspect (24), wherein the material is a silicone-free rubber.

An aspect (26) of the present disclosure pertains to an apparatus according to any of the aspects (21)-(25), wherein, within the second segment the depth has a constant value.

An aspect (27) of the present disclosure pertains to an apparatus according to any of the aspects (21)-(26), wherein, within the second segment the depth is greater than or equal to 100 mm.

An aspect (28) of the present disclosure pertains to an apparatus according to any of the aspects (21)-(27), wherein the vacuum channel comprises a vacuum distributor extending through the second segment, the vacuum distributor comprising a plurality of openings for distributing vacuum pressure originating from the vacuum port.

An aspect (29) of the present disclosure pertains to an apparatus according to the aspect (28), wherein the vacuum distributor connects first and second ends of the first segment.

An aspect (30) of the present disclosure pertains to an apparatus according to any of the aspects (28)-(29), wherein the vacuum ring comprises first portion defining the first segment and a second portion defining the second segment, wherein ends of the vacuum distributor are inserted into the first portion and the vacuum distributor is disposed in the vacuum channel defined by the second portion.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims.

DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. In the drawings.

Figure 1:
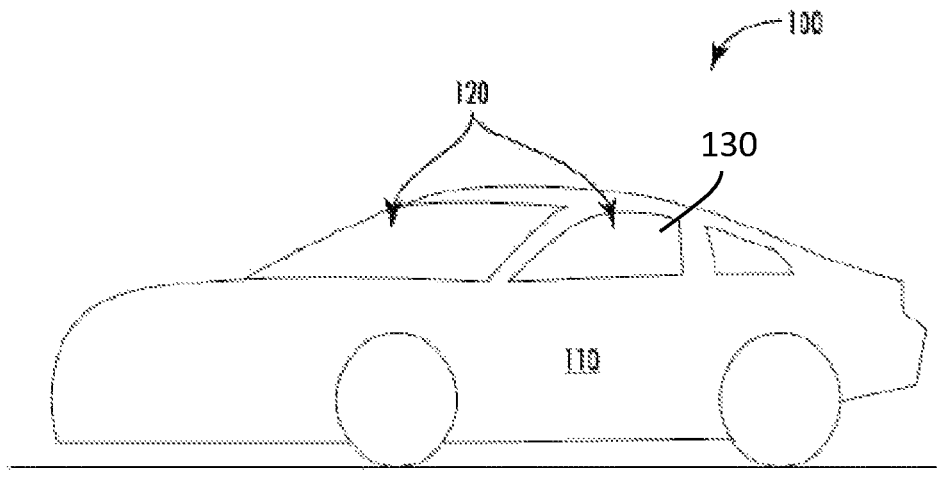
FIG. 1 is an illustration of a vehicle including an automotive glazing according to one or more embodiments of the present disclosure.

It should be understood that numerous other modifications and examples can be devised by those skilled in the art, which fall within the scope and spirit of the principles of this disclosure.

DETAILED DESCRIPTION

Referring generally to the figures, described herein are methods and apparatuses for laminating a second glass ply to a first glass ply, wherein the second glass ply comprises at least one edge that is inboard of an edge of the first glass ply when the plies are disposed in a stack. The vacuum rings of the present disclosure are designed to accommodate a significant offset between the edges of the glass plies of 10 mm or more (e.g., 20 mm or more, 30 mm or more, 40 mm or more, 50 mm or more, 100 mm or more, 150 mm or more, 200 mm or more, 250 mm or more, or even 300 mm or more) even when, in other portions of the stack, the edges are aligned with one another. Such variable edge alignments are accommodated by providing a vacuum ring with a vacuum channel having a depth that circumferentially varies in accordance with an amount of offset between the edges of the plies in the stack. For example, in embodiments, the vacuum ring comprises a first portion where the vacuum channel has a first depth and a second portion where the vacuum channel has a second depth that is at least two times greater (e.g., at least 5 times greater or at least 10 times greater) than the first depth. The first portion can have a peripheral shape to accommodate segments of a periphery of the stack where the edges of the plies are in relative alignment with one another. The second portion may be attached to the first portion so as to form the vacuum channel with a shape that corresponds to or approximates a peripheral shape of the stack (or of the curved glass laminate being formed). An extending portion of the first glass ply that is not covered by the second glass ply is inserted into the second portion such that a majority of the vacuum channel within the second portion contains only the first glass ply, while both the glass plies are inserted into the first portion such that a majority of the vacuum channel within the first portion contains both the first and second plies. The vacuum ring is secured to the stack to seal off the vacuum channel. A negative pressure is applied between the glass plies via the vacuum ring to deair the space between the glass plies and the stack is subsequently heated to bond the glass plies to one another via an interlayer film disposed between the glass plies.

In aspects, the apparatuses and methods described herein can be used to form flat glass laminates (where the glass plies are substantially planar sheets) and curved glass laminates (of simple or complex curvature). In the latter case, methods and apparatuses described herein can be used in a process of forming a curved laminate where one of the glass plies is cold-formed to the other glass ply. For example, in embodiments, when disposed into a stack, the second glass ply may be curved to a lesser extent than the first glass ply. In such embodiments, the negative pressure applied via the vacuum ring can cause the second glass ply to bend into conformity with the first glass ply. Heating and cooling of polymeric interlayer material can then cause the first glass ply to retain the second glass ply in a bent shape.

In aspects, the apparatuses and methods described herein may include a pressing member that is used to contact and force the glass plies against one another after the negative pressure is applied to the space between the glass plies. The pressing member may have a shape corresponding to a desired shape of one of the surfaces of the laminate being formed to facilitate applying uniform pressure to the stack. Such a process has been found to aid in completely deairing the space and prevent defects in the laminate.

The methods and apparatuses described herein beneficially facilitate forming laminates with differently sized glass plies without the use of vacuum bags. This allows manufacturers to utilize existing vacuum ring lines to manufacture laminates where surface areas of the plies differ. Implementation of the techniques described herein will thus be relatively low cost while also enabling the benefits associated with cold-forming for a variety of designs.

Embodiments of laminates are described herein in relation to a vehicle 100 as shown in FIG. 1. The vehicle 100 includes a body 110 defining an interior and at least an opening 120 in communication with the interior. The vehicle 100 further includes an automotive glazing 130, i.e., window, disposed in the opening 120. The automotive glazing 130 may form at least one of the sidelights, windshield, rear window, windows, and sunroofs in the vehicle 100. In some embodiments, the automotive glazing 130 may form an interior partition (not shown) within the interior of the vehicle 100, or may be disposed on an exterior surface of the vehicle 100 and form, e.g., an engine block cover, headlight cover, taillight cover, door panel cover, or pillar cover. As used herein, vehicle 100 includes automobiles (an example of which is shown in FIG. 1), rolling stock, locomotive, boats, ships, and airplanes, helicopters, drones, space craft, and the like. Further, while the present disclosure is framed in terms of a vehicle, methods and apparatuses described herein may be used to form laminates that find use in other contexts, such as in architectural glazing or bullet-resistant glazing applications.

Figure 2A:
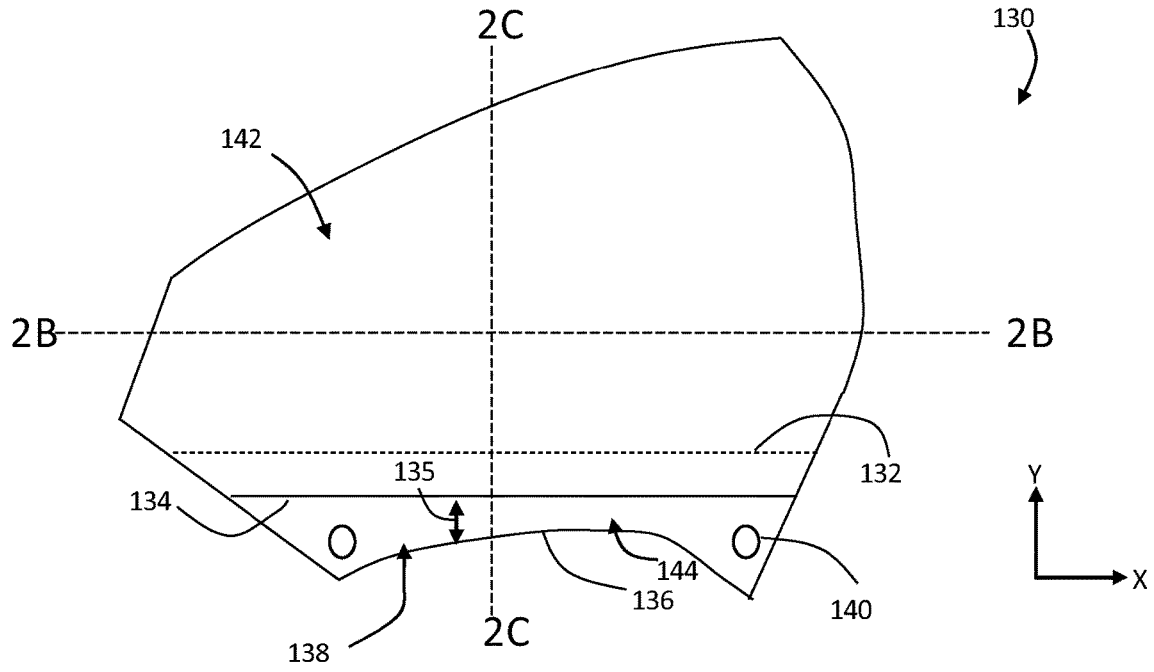
FIG. 2A schematically depicts a plan view of an automotive glazing that can be used as a side window for the vehicle depicted in FIG. 1, according to one or more embodiments of the present disclosure.

FIG. 2A depicts a plan view of the automotive glazing 130. In the depicted embodiment, the automotive glazing 130 is a sidelight for the vehicle 100. As shown, the automotive glazing 130 comprises a belt line 132, which is a portion of the automotive glazing 130 that comes into contact with a window seal when the automotive glazing 130 is installed in the vehicle 100 (e.g., when the window is in a closed position). Portions of the automotive glazing 130 that are beneath the belt line 132 in FIG. 2A are generally not visible (e.g., within a door frame) when the automotive glazing 130 is installed on the vehicle 100.

Figure 2B:
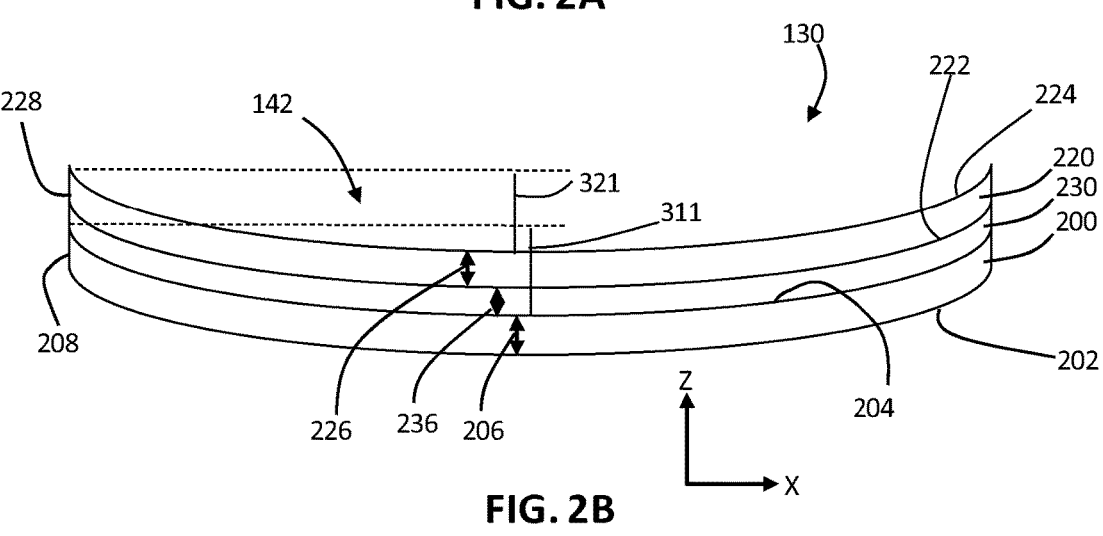
FIGS. 2B and 2C are cross-sectional views of the automotive glazing depicted in FIG. 2A, according to one or more embodiments of the present disclosure.
Figure 2C:
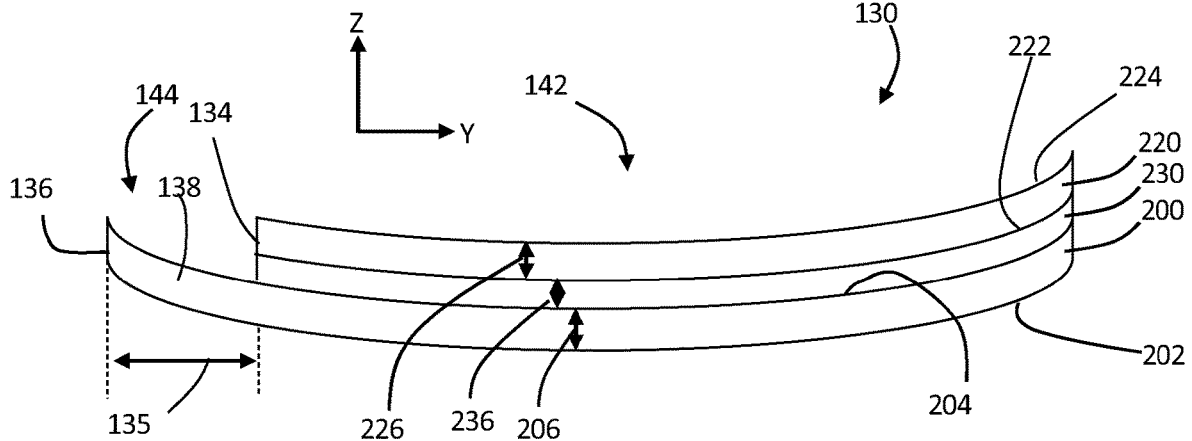

There is a trend in the automotive industry to use laminated glass articles for vehicle sidelights. Laminated glass articles can provide superior impact resistance as compared to existing tempered monolithic glass sheets and also assist in occupant retention in certain accident events. Additionally, the polymeric material in laminates decouples vibrations of the two glass sheets which can provide sound dampening for a quieter driving experience. Various functionalities (e.g., UV or IR absorbing films, tints) can also be added to laminates. Accordingly, in the embodiments described herein, the automotive glazing 130 is a glass laminate. FIG. 2B depicts a cross-sectional view of the automotive glazing 130 through the line 2B-2B in FIG. 2A. FIG. 2C depicts a cross-sectional view of the automotive glazing 130 through the line 2C-2C depicted in FIG. 2A. While this example depicts a curved glass laminate, it should be understood that the methods and apparatuses described herein can be used to form flat glass laminates (where the first and second glass plies 200 and 220 do not exhibit a substantial curvature or a planar).

Referring to FIGS. 1-2C, the automotive glazing 130 comprises a first glass ply 200, a second glass ply 220, and an interlayer 230 disposed between the first glass ply 200 and the second glass ply 220. As used herein, the term "glass ply" is used interchangeably with the terms "glass substrate" and "glass sheet." When the automotive glazing 130 is installed on the vehicle 100, the first glass ply 200 faces towards the external environment of the vehicle 100 and the second glass ply 220 faces the vehicle interior (i.e., a cabin of the vehicle 100). In embodiments, the first glass ply 200 is not chemically strengthened and the second glass ply 220 is chemically strengthened, which provides layers of compressive stress on the exterior of the second glass ply 220. The compressive stress increases the strength and impact performance of the automotive glazing 130. However, the presence of compressive stress in the second glass ply 220 is balanced out by a layer of tensile stress therein, which renders the second glass ply 220 susceptible to failure if surface flaws reach the tensile stress. Interaction of the second glass ply 220 with moving parts (such as a mounting mechanism inside the door of the vehicle 100 that aids in opening and closing the window) may increase the probability of breakage of the second glass ply 220. Interaction of the automotive glazing 130 with other external entities (e.g., users of the vehicles may press on the window, the door frame) may also apply torque to the automotive glazing 130, increasing the likelihood of failure of the second glass ply 220 due to the tension therein.

In view of the foregoing, to decrease the likelihood of failure of the automotive glazing 130, the second glass ply 220 is made smaller than the first glass ply 200 (e.g., the first glass ply 200 can comprise a major surface with a greater surface area than the second glass ply 220). A lowermost edge 134 of the second glass ply 220 is placed beneath the belt line 132 but is offset from a lowermost edge 136 of the first glass ply 200 by a distance 135 of greater than or equal to 10 mm (e.g., greater than or equal to 20 mm, greater than or equal to 30 mm, greater than or equal to 40 mm, greater than or equal to 50 mm, greater than or equal to 100 mm, or even greater than or equal to 150 mm, greater than or equal to 200 mm, or even greater than or equal to 300 mm) in a first direction (the Y-direction depicted in FIG. 2A). In embodiments, the distance 135 varies as a function of position on the automotive glazing 130. In the embodiment depicted in FIGS. 2A-2C, for example, the lowermost edge 134 of the second glass ply 220 does not extend parallel to the lowermost edge 136 of the first glass ply 200 such that the distance is not a constant value (varying as a function of distance in the X-direction). In such embodiments, the distance 135 can have a maximum value that is greater than or equal to 10 mm (e.g., greater than or equal to 20 mm, greater than or equal to 30 mm, greater than or equal to 40 mm, greater than or equal to 50 mm, greater than or equal to 100 mm, or even greater than or equal to 150 mm, greater than or equal to 200 mm, or even greater than or equal to 300 mm).

As a result of the glass plies being differently sized, the first glass ply 200 comprises an extending portion 138 where the first glass ply 200 is not covered by the second glass ply 220. The extending portion 138 can include one or more openings 140 extending therethrough to facilitate mounting the automotive glazing 130 in the vehicle 100 via a suitable mounting mechanism. The extending portion 138 beneficially enables the one or more openings 140 to only be placed in the first glass ply 200 and avoids the requirement to align holes in both glass plies and any strength degradation associated with placing an opening in a chemically strengthened glass sheet. The depicted structure of the automotive glazing 130 thus facilitates providing the benefits of using a laminate structure for a sidelight while decreasing added manufacturing complexity necessitated by hole alignment and eliminating potential causes of failure.

As shown in FIGS. 2B and 2C, the first glass ply 200 comprises a first major surface 202, a second major surface 204, and a thickness 206 extending between the first major surface 202 and the second major surface 204. The first glass ply 200 also includes a plurality of minor surfaces 208 defining a peripheral edge thereof that connect the first major surface 202 to the second major surface 204. The second glass ply 220 comprises a first major surface 222, a second major surface 224, and a thickness 226 extending between the first major surface 222 and the second major surface 224. The second glass ply 220 also includes a plurality of minor surfaces 228 defining a peripheral edge thereof that connect the first major surface 222 to the second major surface 224. The interlayer 230 comprises a thickness 236 and serves to bond the first major surface 222 to the second major surface 204. In embodiments, the first major surface 202 of the first glass ply 200 forms an outer surface of the automotive glazing 130 (and faces an exterior of the vehicle 100) and the second major surface 224 of the second glass ply 220 forms an inner surface of the automotive glazing 130 (and faces an interior of the vehicle 100).

In embodiments, the first glass ply 200 comprises, consists of, or consists essentially of a first glass composition. The first glass composition may comprise any suitable composition, such as a soda lime silicate glass composition, a borosilicate glass composition, an aluminosilicate glass composition, and alkali aluminosilicate glass composition, or an alkali boroaluminosilicate glass composition. In embodiments, the first glass ply 200 comprises one of the fusion-formable borosilicate glass compositions described in U.S. Provisional Patent Application No. 63/123,863, entitled "Fusion Formable Borosilicate Glass Composition and Articles Formed Therefrom" and filed on Dec. 10, 2020, U.S. Provisional Patent Application No. 63/183,271, entitled "Fusion Formable Borosilicate Glass Composition and Articles Formed Therefrom" and filed on May 3, 2021, U.S. Provisional Patent Application No. 63/183,292, entitled "Glass with Unique Fracture Behavior for Vehicle Windshield" and filed on May 3, 2021, U.S. patent application Ser. No. 17/363,266, entitled "Glass with Unique Fracture Behavior for Vehicle Windshield" and filed on Jun. 30, 2021, and International Patent Application No. PCT/US2021/061966, entitled "Glass with Unique Fracture Behavior for Vehicle Windshield" and filed on Dec. 6, 2021, the contents of each of which are hereby incorporated by reference in their entireties. The first glass ply 200 can be chemically strengthened, thermally strengthened, or mechanically strengthened in various embodiments.

In embodiments, the second glass ply 220 comprises, consists of, or consists essentially of a second glass composition that is different from the first composition used to form the first glass ply 210. In embodiments, the second glass composition comprises a soda lime silicate composition, an aluminosilicate glass composition, an alkali aluminosilicate glass composition, an alkali containing borosilicate glass composition, an alkali aluminophosphosilicate glass composition, or an alkali aluminoborosilicate glass composition. In embodiments, the second glass ply 220 is formed of one of the glass compositions described in U.S. patent application Ser. No. 16/002,276, entitled "Automotive Glass Compositions, Articles, and Hybrid Laminates" and filed on Jun. 7, 2018" or U.S. Pat. No. 10,125,044, entitled "Ion Exchangeable High Damage Resistance Glasses" and filed on Nov. 14, 2014. The content of each of these patent applications is hereby incorporated by reference in their entireties.

In embodiments, the second glass ply 220 is chemically strengthened (e.g., when constructed of a suitable alkali aluminosilicate glass composition) and the first glass ply 200 is not chemically strengthened (but may be thermally strengthened or annealed). Such embodiments may aid in reducing the weight of the automotive glazing while still providing favorable mechanical strength and meeting various regulatory requirements associated with automotive applications. Embodiments where both the first glass ply 200 and the second glass ply 220 are strengthened are also envisioned.

Thicknesses of the components of the automotive glazing 130 will now be described. In embodiments, the thickness 206 is at least 0.5 mm, at least 1 mm, at least 2 mm, at least 3 mm, at least 3.3 mm, or at least 3.8 mm. In one or more embodiments, the thickness 206 is in a range from about 0.1 mm to about 6 mm, 0.2 mm to about 6 mm, 0.3 mm to about 6 mm, 0.4 mm to about 6 mm, 0.5 mm to about 6 mm, 0.6 mm to about 6 mm, 0.7 mm to about 6 mm, 0.8 mm to about 6 mm, 0.9 mm to about 6 mm, 1 mm to about 6 mm, 1.1 mm to about 6 mm, 1.2 mm to about 6 mm, 1.3 mm to about 6 mm, 1.4 mm to about 6 mm, 1.5 mm to about 6 mm, 1.6 mm to about 6 mm, from about 1.8 mm to about 6 mm, from about 2 mm to about 6 mm, from about 2.2 mm to about 6 mm, from about 2.4 mm to about 6 mm, from about 2.6 mm to about 6 mm, from about 2.8 mm to about 6 mm, from about 3 mm to about 6 mm, from about 3.1 mm to about 6 mm, from about 3.2 mm to about 6 mm, from about 3.3 mm to about 6 mm, from about 3.4 mm to about 6 mm, from about 3.5 mm to about 6 mm, from about 3.6 mm to about 6 mm, from about 3.7 mm to about 6 mm, from about 3.8 mm to about 6 mm, from about 3.9 mm to about 6 mm, from about 4 mm to about 6 mm, from about 4.2 mm to about 6 mm, from about 4.4 mm to about 6 mm, from about 4.5 mm to about 6 mm, from about 4.6 mm to about 6 mm, from about 4.8 mm to about 6 mm, from about 5 mm to about 6 mm, from about 5.2 mm to about 6 mm, from about 5.4 mm to about 6 mm, from about 5.5 mm to about 6 mm, from about 5.6 mm to about 6 mm, from about 5.8 mm to about 6 mm, from about 1.6 mm to about 5.8 mm, from about 1.6 mm to about 5.6 mm, from about 1.6 mm to about 5.5 mm, from about 1.6 mm to about 5.4 mm, from about 1.6 mm to about 5.2 mm, from about 1.6 mm to about 5 mm, from about 1.6 mm to about 4.8 mm, from about 1.6 mm to about 4.6 mm, from about 1.6 mm to about 4.4 mm, from about 1.6 mm to about 4.2 mm, from about 1.6 mm to about 4 mm, from about 1.6 mm to about 3.9 mm, from about 1.6 mm to about 3.8 mm, from about 1.6 mm to about 3.7 mm, from about 1.6 mm to about 3.6 mm, from about 1.6 mm to about 3.5 mm, from about 1.6 mm to about 3.4 mm, from about 1.6 mm to about 3.3 mm, from about 1.6 mm to about 3.2 mm, from about 1.6 mm to about 3.1 mm, from about 1.6 mm to about 3 mm, from about 1.6 mm to about 2.8 mm, from about 1.6 mm to about 2.6 mm, from about 1.6 mm to about 2.4 mm, from about 1.6 mm to about 2.2 mm, from about 1.6 mm to about 2 mm, from about 1.6 mm to about 1.8 mm, from about 3 mm to about 5 mm, or from about 3 mm to about 4 mm.

In embodiments, the thickness 226 of the second glass ply 220 is less than the thickness 206. In embodiments, the thickness is less than or equal to 2.0 mm (e.g., greater than or equal to 0.1 mm and less than or equal to 2.0 mm, greater than or equal to 0.1 mm and less than or equal to 1.8 mm, greater than or equal to 0.1 mm and less than or equal to 1.6 mm, greater than or equal to 0.5 mm and less than or equal to 1.5 mm, greater than or equal to 0.7 mm and less than or equal to 1.4 mm, greater than or equal to 0.7 mm at less than or equal to 1.2 mm, greater than or equal to 0.7 mm and less than or equal to 1.1 mm). In embodiments, the total glass thickness (i.e., the thickness 206 plus the thickness 226) is 8 mm or less, 7 mm or less, 6.5 mm or less, 6 mm or less, 5.5 mm or less, or 5 mm or less. In embodiments, the lower limit of the total glass thickness is about 2 mm. In embodiments, the thickness 206 is at least twice (e.g., at least three times, at least four times) the thickness 226. Such asymmetric designs have been found to improve impact performance while still providing weight savings over existing symmetrical designs.

Referring still to FIGS. 2A and 2B, the interlayer 230 bonds the second major surface 204 of the first glass ply 200 to the first major surface 222 of the second glass ply 220. In embodiments, the interlayer 230 comprises a polymer, such as at least one of polyvinyl butyral (PVB), acoustic PVB (APVB), an ionomer, an ethylene-vinyl acetate (EVA) and a thermoplastic polyurethane (TPU), a polyester (PE), a polyethylene terephthalate (PET), or the like. The thickness 236 of the interlayer 230 may be in the range from about 0.5 mm to about 2.5 mm, in particular from about 0.7 mm to about 1.5 mm. In other embodiments the thickness 236 may be less than 0.5 mm or more than 2.5 mm. Further, in embodiments, the interlayer 230 may comprise multiple polymeric layers or films providing various functionalities. For example, in embodiments, the interlayer 230 may incorporate at least one of a display, solar insulation, sound dampening, an antenna, an anti-glare treatment, or an anti-reflective treatment, among others. In particular embodiments, the interlayer 230 is modified to provide ultraviolet (UV) absorption, infrared (IR) absorption, IR reflection, acoustic control/dampening, adhesion promotion, and tint. The interlayer 230 can be modified by a suitable additive such as a dye, a pigment, dopants, etc. to impart the desired property.

In embodiments, at least one of the first glass ply 200 and the second glass ply 220 is provided with a functional or decorative coating in addition to the interlayer 230. Such functional or decorative coatings may be deposed any of the first major surface 202, the second major surface 204, the first major surface 222, and the second major surface 224. In embodiments, the coating is at least one of an infrared reflective (IRR) coating, frit, anti-reflective coating, or pigment coating. In an example embodiment of an IRR, the second major surface 204 of the first glass ply 310 or the first major surface 222 of the second glass ply 220 is coated with an infrared-reflective film and, optionally, one or more layers of a transparent dielectric film. In embodiments, the infrared-reflecting film comprises a conductive metal, such as silver, gold, or copper, that reduces the transmission of heat through the automotive glazing. In embodiments, the optional dielectric film can be used to anti-reflect the infrared-reflecting film and to control other properties and characteristics of the coating, such as color and durability. In embodiments, the dielectric film comprises one or more oxides of zinc, tin, indium, bismuth, and titanium, among others. In an example embodiment, the IRR coating includes one or two silver layers each sandwiched between two layers of a transparent dielectric film. In embodiments, the IRR coating is applied using, e.g., physical or chemical vapor deposition or via lamination.

In embodiments, at least one of the first glass ply 200 and the second glass ply 220 comprises a decorative layer disposed thereon. For example, in embodiments, a first decorative layer is disposed on a surface of the second glass ply 220 and a second decorative layer is disposed on a surface of the first glass ply 200. Such decorative layers may serve to protect adhesive that is used to attach the automotive glazing 130 into the opening 120 from degradation from exposure to UV light. Multiple decorative bands are particularly beneficial in providing a desired aesthetic appearance when the first glass ply 200 and the second glass ply 220 are constructed of glasses with different compositions and/or thicknesses.

In embodiments, the automotive glazing 130 exhibits at least one curvature comprising a radius of curvature that is in the range of 300 mm to about 10 m along at least a first axis. In the example shown in FIGS. 2B-2C, the second major surface 204 of the first glass ply 200 has a first curvature depth 311 defined as the maximum depth from planar (dashed line) of the second major surface 204. The second major surface 224 of the second glass ply 220 has a second curvature depth 321 defined as the maximum depth from planar (dashed line) of the second major surface 224. In embodiments, one or both the first curvature depth 311 and the second curvature depth 321 is about 2 mm or greater. Curvature depth may be defined as maximum distance a surface is distanced orthogonally from a plane defined by points on a perimeter of that surface. For example, one or both the first curvature depth 311 and the second curvature depth 321 may be in a range from about 2 mm to about 100 mm (e.g., 2 mm to 50 mm, 2 mm to 30 mm). In embodiments, the first curvature depth 311 and the second curvature depth 321 are substantially equal to one another. In one or more embodiments, the first curvature depth 311 is within 10% of the second curvature depth 321, in particular within 5% of the second curvature depth 321. For illustration, in an example where the second curvature depth 321 is about 15 mm, the first curvature depth 311 may be range from about 13.5 mm to about 16.5 mm (or within 10% of the second curvature depth 321).

In embodiments, such as the embodiment depicted in FIGS. 2A-2C, the automotive glazing 130 is complexly curved and exhibits curvature about two distinct axes of curvature. In such embodiments, the automotive glazing 130 exhibits at least one curvature comprising a radius of curvature that is in the range of 300 mm to about 10 m along a second axis that is transverse, in particular, perpendicular to the first axis. The extent and type of curvature may vary depending on the design of the vehicle 100.

In embodiments, differences in one or more of thickness and composition between the first glass ply 200 and the second glass ply 220 render using thermal forming techniques for both glass plies unsuitable. For example, certain existing co-sagging techniques, where the glass plies are stacked on top of one another, heated to a forming temperature, and shaped, may result in unacceptable shape mismatches between the plies and degrade appearance and optical performance of the automotive glazing 130. Particularly, relatively low thicknesses for the second glass ply 220 of 1.5 mm less may render the second glass ply 220 susceptible to defects if hot-bending techniques are used.

To avoid having to use hot forming techniques for the second glass ply 220, the automotive glazing 130 may be formed using a cold-forming process. In such a process, when the automotive glazing 130 is assembled, the first glass ply 200 may be pre-curved (e.g., such that the second major surface 204 possess a minimum radius of curvature along at least one axis of curvature that is less than that of the first major surface 222 of the second glass ply) and the second glass ply 220 may be pressed into conformity with the first glass ply 200. Particularly, in such a process, the second glass ply 220 is pressed into conformity with the first glass ply 200 at a temperature less than the softening temperature of the second glass composition (in particular at a temperature of 200° C. or less, 100° C. or less, 50° C. or less, or at room temperature). The material of the interlayer 230, under the influence of heat and pressure, may bond the first glass ply 200 and the second glass ply 220 such that the first glass ply 200 retains the second glass ply 220 in a bent state (e.g., such that the second glass ply 220 has an asymmetric surface compressive stress distribution between the first major surface 222 and the second major surface 224).

Irrespective of whether the first and second glass plies 200 and 220 are flat or curved and whether one of the plies is cold-formed, the size difference between the first glass ply 200 and the second glass ply 220 described herein may create difficulties laminating the first and second glass plies 200 and 220 to one another by interfering with existing deairing techniques. As shown in FIGS. 2A-2C, the automotive glazing 130 comprises a first region 142 where peripheral edges of the first glass ply 200 and the second glass ply 220 (formed by the minor surfaces 208 and 228) are aligned with one another and a second region 144 where the lowermost edges 134 and 136 are offset from one another by the distance 135 (in the Y-direction). As used herein, the term "aligned," when used to describe relative placement of glass plies, refers to a situation where peripheral edges of the glass plies (formed by the minor surfaces 208 and 228 described herein) are offset (in a direction extending perpendicular to the minor surfaces 208 and 228, or the Y-direction shown in the particular example depicted in FIG. 2C) by less than 3 mm. Glass substrate edges that are in alignment or substantial alignment with one another are separated by no more than 3.0 mm in a direction extending perpendicular to at least one of the edges (or minor surfaces) at a midpoint thereof.

As described herein, the lack of alignment between the lowermost edges 134 and 136 in the second region 144 may render certain existing deairing techniques and equipment unsuitable. In certain existing techniques, vacuum rings may be placed around a periphery of a stack of glass substrates to seal off the space between the substrates and a vacuum may be applied to the vacuum ring to force the substrates together and cause a flat glass substrate to conform with a pre-curved glass substrate. Existing vacuum rings may have vacuum channels of insufficient depth to accommodate the second region 144, especially given that the distance 135 by which the lowermost edges 134 and 136 are offset is greater than 10 mm or even greater than or equal to 100 mm in some embodiments. An alternative to vacuum rings is inserting the entire stack into a vacuum bag and placing the vacuum bag into an autoclave, where the negative pressure between the glass substrates caused by the vacuum bag and the positive pressure in the autoclave provides sufficient force to bend the flat glass substrate into conformity with the pre-curved glass substrate. Vacuum bags can add significant mass to the stack and alter the heating requirements to provide adequate lamination. Vacuum rings are preferable because they are compatible with lehrs in pre-existing fabrication lines, are reusable, and more efficient.

Figure 3:
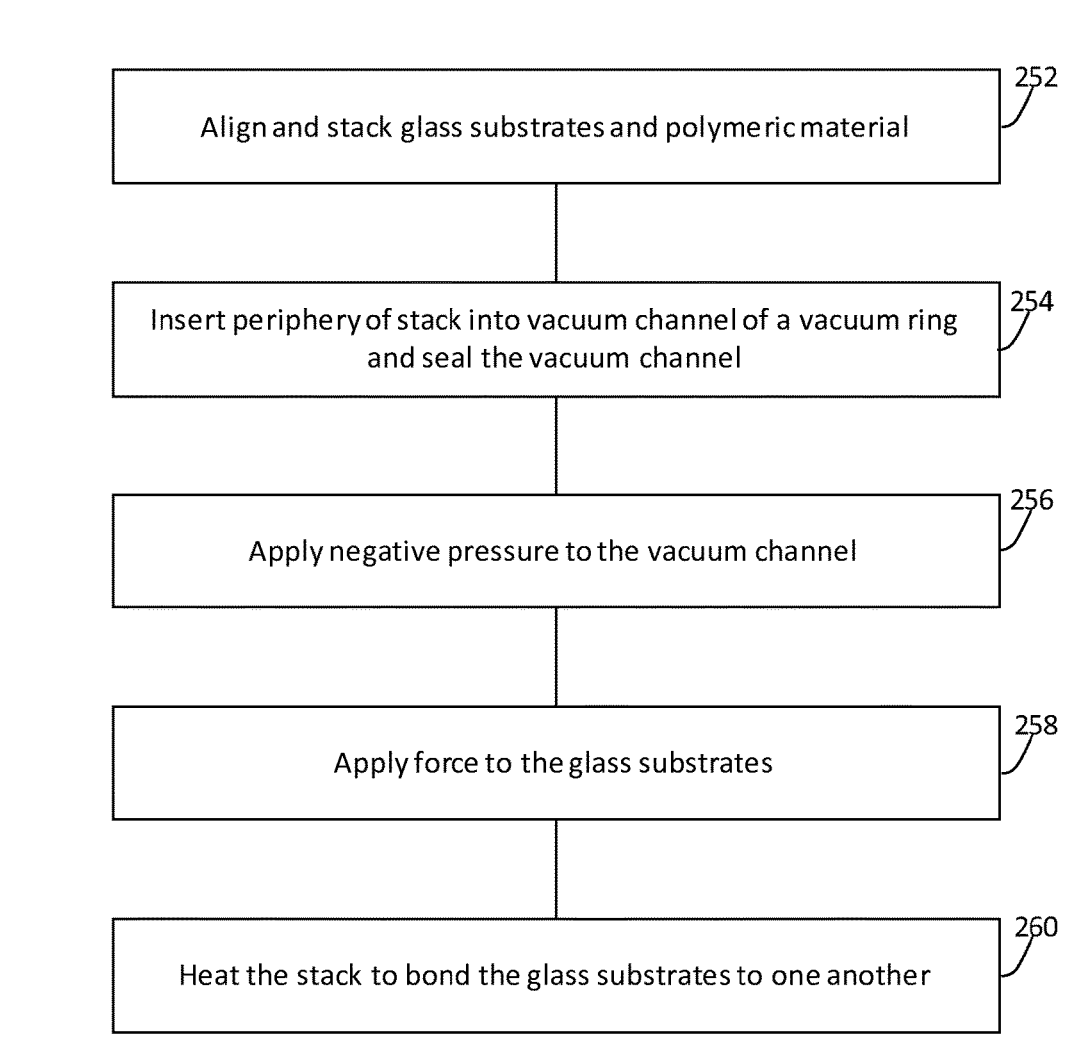
FIG. 3 is a flow diagram of a method of fabricating a curved glass laminate where one of the glass plies is cold-formed and comprises an edge that is offset from an edge of the other one of the glass plies, according to one or more embodiments of the present disclosure.

In view of the foregoing, a lamination process has been developed using a vacuum rings that are specifically designed to accommodate situations where edges of the glass plies are not aligned with one another. FIG. 3 depicts a flow diagram of a method 250 of fabricating a glass laminate, according to an example embodiment of the present disclosure. The method 250 is performed to fabricate a glass wherein a first, relatively flat glass substrate bonded to a second glass substrate and wherein the second substrate has a lesser surface area than the first glass substrate so that the second substrate comprises an edge that is offset from a corresponding edge of the second glass substrate by a distance that is greater than or equal to 10 mm, greater than or equal to 50 mm, greater than or equal to 100 mm, or even greater than or equal to 150 mm. For example, the method 250 may be used to fabricate the automotive glazing 130 described herein with respect to FIGS. 1-2C. Accordingly, reference will be made to various components depicted in FIGS. 1-2C to aid in describing the method 250. It should be understood that the method 250 may be used to form laminates other than the automotive glazing 130 and the automotive glazing 130 is only used as an example. The method 250 may also be used to form curved glass laminates where one of the glass plies is cold-formed to the other one of glass plies. An example of such a cold-forming process is described herein with respect to FIGS. 5A, 5B, and 6.

At block 252, the second glass ply 220, is positioned onto the first glass ply 200 with a film of polymeric material (represented by the interlayer 230) positioned between the first glass ply 200 and the second glass ply 220 to form a stack. In embodiments, when the stack is formed, the one of the glass plies is in an un-bent (e.g., flat, lesser curved) state while the other one of the glass plies is pre-curved (e.g., via a hot-forming process to have a simple or complex curvature. An example stack 400 will be described in greater detail herein with respect to FIGS. 5A and 5B. When the stack is formed, the first and second glass plies 200 and 220 are generally aligned with one another so that peripheral edges are positioned in the manner that they will eventually have in the automotive glazing 130. As such, the stack comprises the first region 142 (see FIG. 1) where peripheral edges of the first and second glass plies 200 and 220 are in alignment with one another (e.g., in the first region 142, the minor surfaces 208 and 228 are aligned in the Z-direction, or offset from one another in a direction perpendicular to the Z-direction by less than or equal to 3 mm) and a second region 144 (see FIG. 1) where the lowermost edge 136 of the first glass ply 200 is outwardly disposed of the lowermost edge 134 of the second glass ply 220. Put differently, as a result of the alignment of the plies in the stack, the first glass ply 200 comprises an extending portion 138 that is not covered by the second glass ply 220. The second glass ply 220 is larger than the first glass ply 200 such that the lowermost edges 134 and 136 are separated by the distance 135 that has a maximum value that is greater than or equal to 10 mm, greater than or equal to 50 mm, greater than or equal to 100 m, or even greater than or equal to 150 mm. The film of the interlayer 230 may be cut to have a peripheral shape that corresponds to a peripheral shape of the first region 142 (e.g., the film may be cut to have a peripheral shape that substantially corresponds to a peripheral shape of the second glass ply 220).

Figures 4A, 4B, 4C:
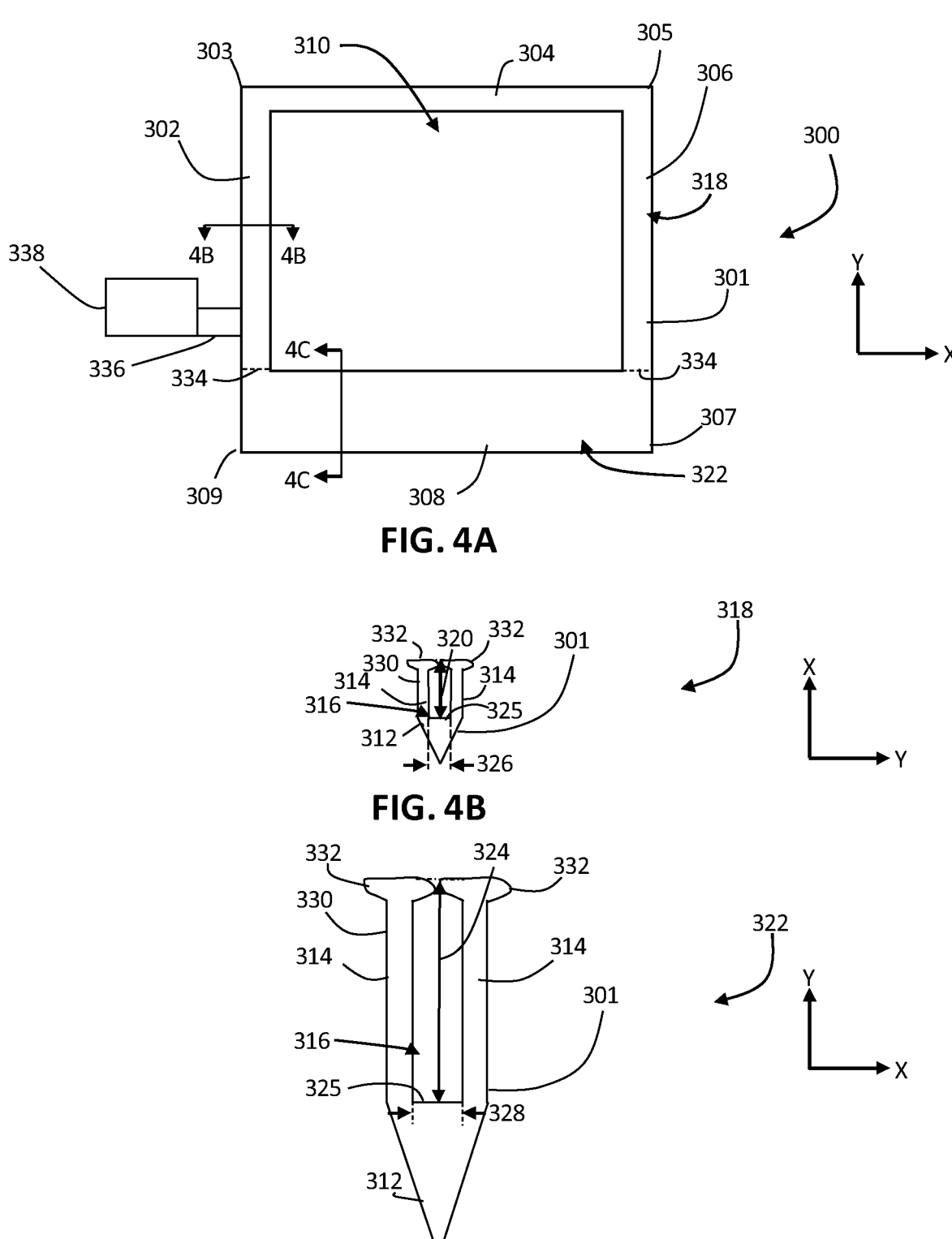
FIG. 4A schematically depicts a plan view of a vacuum ring, according to one or more embodiments of the present disclosure.
FIG. 4B schematically depicts a cross-sectional view of a first portion of the vacuum ring depicted in FIG. 4A, according to one or more embodiments of the present disclosure.
FIG. 4C schematically depicts a cross-sectional view of a second portion of the vacuum ring depicted in FIG. 4A, according to one or more embodiments of the present disclosure.

At block 254, a periphery of the stack is inserted into a vacuum channel of a vacuum ring and then the vacuum channel is sealed. As described herein, the offset edges of the first and second glass plies 200 and 220 resulting from the extending portion 138 renders certain previously existing vacuum rings unsuitable for forming the automotive glazing 130 described herein. Accordingly, with reference to FIGS. 4A-4C, a vacuum ring 300 has been specifically designed to accommodate stacks where edges of individual glass plies are offset from one another by significant amounts. FIG. 4A schematically depicts a plan view of the vacuum ring 300. As shown, the vacuum ring 300 comprises a body 301 that forms a continuous loop that circumferentially surrounds an opening 310 for inserting the stack of the first and second glass plies 200 and 220. The body 301 may be formed of any suitable material or combination of materials. For example, in embodiments, the body 301 comprises a unitary piece of a single material (e.g., a suitable rubber such as a rubber not containing silicone, which are beneficial for not marking the glass).

The body 301 is depicted to include a first side 302, a first corner 303, a second side 304, a second corner 305, a third side 306, a third corner 307, a fourth side 308, and a fourth corner 308. Adjacent ends of the first side 302 and the second side 304 meet at the first corner 303. Adjacent ends of the second side 304 and the third side 306 meet at the second corner 305. Adjacent ends of the third side 306 and the fourth side 308 meet at the fourth corner 307. Adjacent ends of the fourth side 308 and the first side 302 meet at the fourth corner 309. Each of the sides 302, 304, 306, and 308 represents a segment of material of the 301 body that may generally be designed to accommodate an associated segment of the periphery of the stack of the first and second glass plies 200 and 220. While, in the depicted embodiment, the sides 302, 304, 306, and 308 are linear segments of material, the sides 302, 304, 306, and 308 may have any suitable shape to accommodate various glass substrates having different peripheral shapes. Generally, the opening 310 will have a shape that roughly corresponds to a peripheral shape of the curved laminate being formed and/or a peripheral shape of the larger glass ply in the stack (the first glass ply 200 in the example described herein). In embodiments, the body 301 is formed by joining the sides 302, 304, 306, and 308 to one another via a suitable technique such that the vacuum ring 300 is capable of forming an airtight seal around the stack. For example, the first side 302 and the second side 304 may initially be separate pieces of material and joined to one another to form the first corner 303.

FIG. 4B depicts a cross-sectional view of the vacuum ring 300 through the line 4B-4B of FIG. 4A. FIG. 4C depicts a cross-sectional view of the vacuum ring 300 through the line 4C-4C of FIG. 4A. As shown in FIGS. 4B-4C, the body 301 comprises a base 312 and a pair of sidewalls 314 extending from the base 312 to define a vacuum channel 316. The vacuum channel 316 comprises a depth that circumferentially varies around the continuous loop to accommodate portions of the periphery of the stack of glass plies inserted therein where the edges of the glass plies are offset from one another. In the example shown, the vacuum ring 300 comprises a first portion 318 where the vacuum channel 316 has a first depth 320 and a second portion 322 where the vacuum channel 316 has a second depth 324 that is at least two times (e.g., at least 3 times, at least 4 times, at least 5 times, at least 7 times, at least 10 times, at least 15 times, at least 20 times, at least 30 times) greater than the first depth 320. That is, the sidewalls 314 of the body 301 vary in length so as to provide the first portion 318 and the second portion 322. In embodiments, the second depth 324 is greater than or equal to the maximum value of the distance 135 by which the lowermost edges 134 and 136 (see FIG. 2A) are offset from one another. As such, in embodiments, the second depth 324 is greater than or equal to 10 mm (e.g., greater than or equal to 20 mm, greater than or equal to 30 mm, greater than or equal to 40 mm, greater than or equal to 50 mm, greater than or equal to 100 mm, or even greater than or equal to 150 mm, greater than or equal to 200 mm, or even greater than or equal to 300 mm). In embodiments, the first depth 320 is that associated with certain existing vacuum rings, or less than or equal to 10 mm (e.g., less than or equal to 9 mm, less than or equal to 8 mm).

In embodiments, the depth of the vacuum channel 316 represents a maximum distance between a floor 325 of the vacuum channel 316 and ends of the side walls 314 that is measured in a direction parallel a lengthwise direction of the sidewalls 314. The depth of the vacuum channel 316 is generally measured in directions parallel to the lengthwise or widthwise dimensions of the glass plies. Along the first side 302 and the third side 306, the depth is measured in the X-direction, or the lengthwise direction of the glass plies. Along the second side 304 and the fourth side 308, the depth is measured in the Y-direction, or the lengthwise direction of the glass plies. In embodiments, the depth is constant in each of the first portion 318 and the second portion 322. In embodiments, the depth varies within at least one of the first portion 318 and the second portion 322. For example, the second depth 324 may vary as a function of position within the second portion 322 to accommodate varying amounts by which the edges of the first and second glass plies 200 and 220 are offset from one another. In such embodiments, the second depth 324 may have a maximum value that is greater than or equal to 10 mm, greater than or equal to 50 mm, greater than or equal to 100 mm, or even greater than or equal to 150 mm and a minimum value that is less than or equal to 10 mm. It is believed that the embodiments where the second depth 324 has a constant value are advantaged by being more simply manufactured.

The vacuum channel 316 includes a width measured in a direction perpendicular to the direction in which the depth is measured. For example, as shown in FIGS. 4B and 4C, in the first portion 318, the vacuum channel 316 comprises a first width 326 and, in the second portion 322, the vacuum channel 316 comprises a second width 328. In embodiments, the width of the vacuum channel 316 is substantially constant around an entirety of the vacuum ring 300. In such embodiments, the first width 326 may be approximately equal to the second width 328. In embodiments, the width is less than or equal to a total thickness of the automotive glazing 130 (the laminate being formed after completion of the method 250). Such a width may facilitate forming a seal with both the first and second glass plies 200 and 220 when the stack is inserted into the vacuum channel 316.

Referring still to FIGS. 4B and 4C, in embodiments, the sidewalls 314 comprise wall portions 330 that extend substantially parallel to one another to form a main portion of the vacuum channel 316 and sealing portions 332 at ends thereof. The sealing portions 332 extend inward from the wall portions 330 (towards a center of the vacuum channel 316) such that the width of the vacuum channel 316 is decreased adjacent to the sealing portions 332. The narrower width at the end of the vacuum channel 316 provided by the sealing portions 332 may concentrate contact between the vacuum ring 300 and the stack of the first and second glass plies 200 and 220 to facilitate sealing off the vacuum channel 316 and application of a vacuum thereto, as described herein. The present disclosure is not limited to any particular cross-sectional shape of the sidewalls 314.

The length and arrangement of the first and second portions 318 and 322 of the vacuum ring 300 may vary depending on the relative size and shape of the glass plies being formed. In the example depicted in FIGS. 2A-2C, the extending portion 138 of the first glass ply 200 only extends outward of the lowermost edge 134 of the second glass ply 220. Accordingly, the second portion 322 is localized within the fourth side 308 of the body 301 because only a single edge of the first glass ply 200 is not aligned with another edge of the second glass ply 220. Thus, in the depicted embodiment, the second portion 322 may extend an entirety of the distance between the third corner 307 and the fourth corner 309. In such embodiments, boundaries 334 between the first portion 318 and the second portion 322 may be disposed on the first side 302 and the third side 306 (e.g., such that the vacuum channel 316 has a varying depth along such sides). In alternative embodiments, the boundaries 334 may be disposed on the fourth side 308 or extend from the third and fourth corners 307 and 309. In any event, the second portion 322 is generally sized to have a length that is greater than or equal to a length of the extending portion 138 (measured in a direction perpendicular to the direction in which the distance 135 is measured).

In embodiments, the vacuum ring 300 comprises more than two portions. In embodiments, for example, a plurality of different portions can make up segments of the continuous loop and, within adjacent ones of the portions, the vacuum channel 316 comprises a different average depth. The portions can be arranged in any suitable pattern to accommodate for varying arrangements of offset between the edges of the glass plies that are being formed into the curved laminate.

As shown in FIG. 4A, the vacuum ring 300 further includes one or more vacuum ports 336 in fluid communication with the vacuum channel 316. The vacuum ports 336 may be connected to any suitable location of the body 301. In embodiments, the vacuum ring 300 includes at least two vacuum ports 336 to facilitate quickly applying negative pressure to the vacuum channel 316 once the periphery of the stack of the first and second glass plies 200 and 220 is inserted therein. The vacuum ring 300 can be secured to the stack by using clips, clamps, or other suitable fastening device that force the inner surfaces of the vacuum channel 316 (e.g., associated with the sealing portions 332) against the outer surfaces of the stack to form a seal. The one or more vacuum ports 336 are in fluid communication with a suitable vacuum source 338 (e.g., a vacuum pump) to apply negative pressure and evacuate air out of the space between the first and second glass plies 200 and 220.

Figures 5A, 5B:
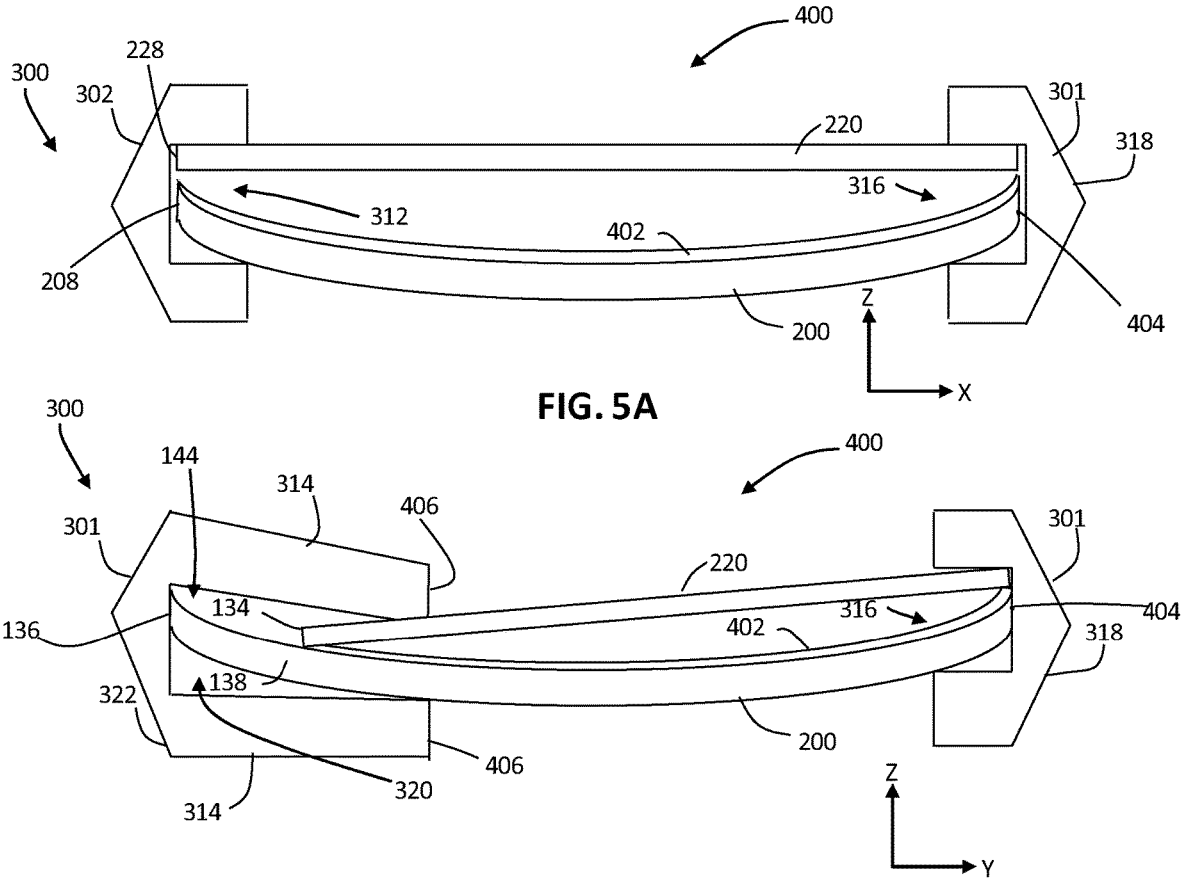
FIGS. 5A and 5B schematically depict cross-sectional views of a stack of glass plies and a film of polymeric material having a periphery inserted into the vacuum ring depicted in FIGS. 4A-4C, according to one or more embodiments of the present disclosure.
Figure 6:
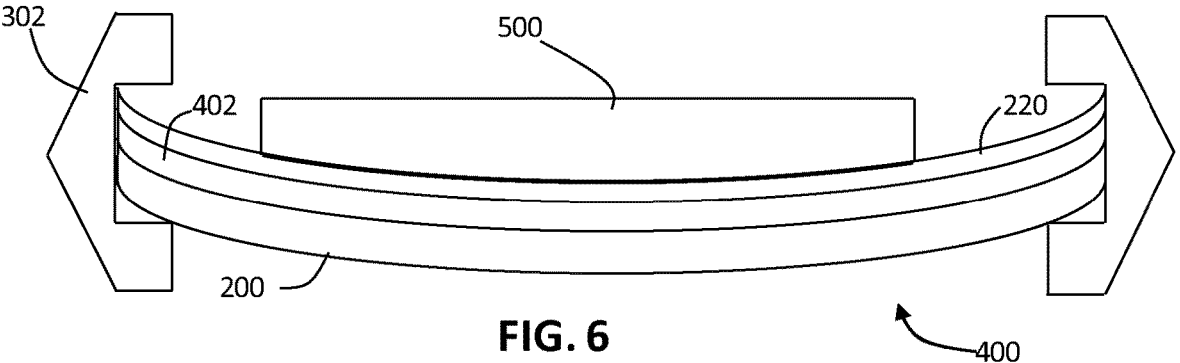
FIG. 6 schematically depicts a cross-sectional view of a pressing member applying force to a glass ply to press a glass ply into conformity with a pre-curved glass ply, according to one or more embodiments of the present disclosure.

FIGS. 5A and 5B schematically depict cross-sectional views of a stack 400 disposed in the vacuum ring 300 depicted in FIGS. 4A-4C, according to one or more embodiments of the present disclosure. The stack 400 corresponds to the components of the automotive glazing 130 described herein with respect to FIGS. 2A-2C prior to completion of the method 250 depicted in FIG. 3. In embodiments, the first and second glass plies 200 and 220 are cut to a final shape prior to being joined via the method 250 and so the stack, in plan view, has a similar appearance to the automotive glazing 130 depicted in FIG. 2A. FIG. 5A depicts a cross-sectional view of the stack 400 through the line 2B-2B of FIG. 2A. FIG. 5B depicts a cross-sectional view of the stack 400 through the line 2C-2C of FIG. 2A. While not shown in FIGS. 5A and 5B, when in a non-bent state, the second glass ply 220 may have a greater lengthwise dimension (in the X-direction) than the first glass ply 200 so that the minor surface 228 lies substantially in alignment (within the first region 142) with the minor surface 208 after cold-forming. While not depicted in the figures herein, the first and second glass plies 200 and 220 may be subjected to any suitable edge finishing process (e.g., grinding, polishing, laser processing) such that the minor surfaces 208 and 228 have any suitable profile (e.g., bullnose, C-shaped, beveled edges).

As shown in FIGS. 5A and 5B, to form the stack 400, the second glass ply 220 is positioned onto the first glass ply 200 with a film 402 of polymeric material (associated with the interlayer 230) between the first glass ply 200 and the second glass ply 220. The first and second glass plies 200 and 220 are in alignment such that the extending portion 138 of the first glass ply 200 is not covered by the second glass ply 220 (or the extending portion 138 is not overlapped by the second glass ply 220 in the Z-direction, corresponding to a direction in which the second glass ply 220 is bent to form the automotive glazing 130). Moreover, as shown, the entirety of a periphery (comprising of all of the minor surfaces 208 and 228 in the first region 142 and one of the minor surfaces 208—the lowermost edge 136—in the second region 144) is inserted into the vacuum channel 316 of the vacuum ring 300.

The circumferentially varying depth of the vacuum channel 316 permits the sidewalls 314 of the body 301 to contact both the first and second glass plies 200 and 220, despite the lowermost edge 136 extending beyond the lowermost edge 134 by a distance 135 (see FIG. 2C) that is greater than or equal to 10 mm, and, in some embodiments, greater than or equal to 100 mm, and, in some embodiments, even greater than or equal to 150 mm. As shown in FIG. 4B, in the second portion 322 of the vacuum ring 300, the sidewalls 314 are sized such that ends 406 thereof overlap both the first glass ply 200 and the second glass ply 220. As a result, a clamp or other suitable force application means can be applied to the sidewalls 314 to force the ends 406 against the outer surfaces (the first major surface 202 and the second major surface 224 in the depicted example, see FIGS. 2A-2C) of the stack 400 and seal off the space between the first and second glass plies 200 and 220.

Referring back to FIG. 3, the remainder of the method 250 will be described with reference to the stack 400. It should be understood that the method 250 will generally be the same in a case where the second glass ply 220 is not cold-formed and/or where the automotive glazing 130 is flat, with the exception that neither of the glass plies will be bent.

At block 256, after the periphery 404 of the stack 400 is inserted into the vacuum channel 316 (see FIGS. 5A and 4B), a negative pressure is applied to the vacuum channel 316. The vacuum source 338 and one or more vacuum ports 336 (see FIG. 4A) may be used to apply the negative pressure and to deair the space between the first glass ply 200 and the second glass ply 220. The negative pressure is applied prior to heating the stack 400 to facilitate air being evacuated from the film 402. Such timing beneficially prevents air bubbles from forming in the interlayer 230 and facilitates the automotive glazing 130 having favorable optical performance attributes. In the depicted example, the negative pressure applied by the one or more vacuum ports 336 can cause the second glass ply 220 to bend to against the first glass ply 200 (such that the second major surface 204 is in conformity with the first major surface 222 with the film 402 disposed therebetween).

At block 258, after application of the negative pressure, force is applied to the first and second glass plies 200 and 220 to complete deairing of the space between the first and second glass plies 200 and 220. It has been found that the negative pressure applied via the vacuum ring 300 described herein largely deairs the space and bends the second glass ply 220 into conformity with the first glass ply 200. However, solely relying on the vacuum ring 300 has been found to risk pockets of air remaining in the space between the first and second glass plies 200 and 220, potentially leading to increased haze (transmission haze) of the automotive glazing 130. Accordingly, with reference to FIG. 6, a pressing member 500 can be used to force the second glass ply 220 against the first glass ply 200. For example, the first glass ply 200 can be resting on a support surface and the pressing member 500 may apply a downward force to the second glass ply 220 against the first glass ply 200. The pressing member 500 may have any suitable shape. In embodiments, the pressing member 500 is a preform having a pressing surface that contacts the second glass ply 220 (or a protective/non-stick layer disposed thereon) with a shape that substantially corresponds to that of the second major surface 204. Such a pressing member 500 may facilitate uniform application of force and elimination of air pockets throughout the space between the first and second glass plies 200 and 220. In embodiments, other suitable techniques may be used to apply the force (e.g., by hand, rollers, clamps, weighted cloths, and the like).

Referring again to FIG. 3, at block 260, after application of the force, the stack 400 is heated to bond the first and second glass plies 200 and 220 to one another via interlayer 230 and retain the second glass ply 220 in a cold-formed (or bent) state. The stack 400 may be placed in a suitable furnace (e.g., lehr used in existing fabrication lines for automotive glazings, an autoclave) and heated to a softening temperature of the polymer material of the film 402. The heating may cause the film 402 to bond to the first and second glass plies 200 and 220. Subsequent cooling may cause the film 402 to cure into the shape of the interlayer 230 and to retain the second glass ply 220 in the cold-bent state.

Figure 7:
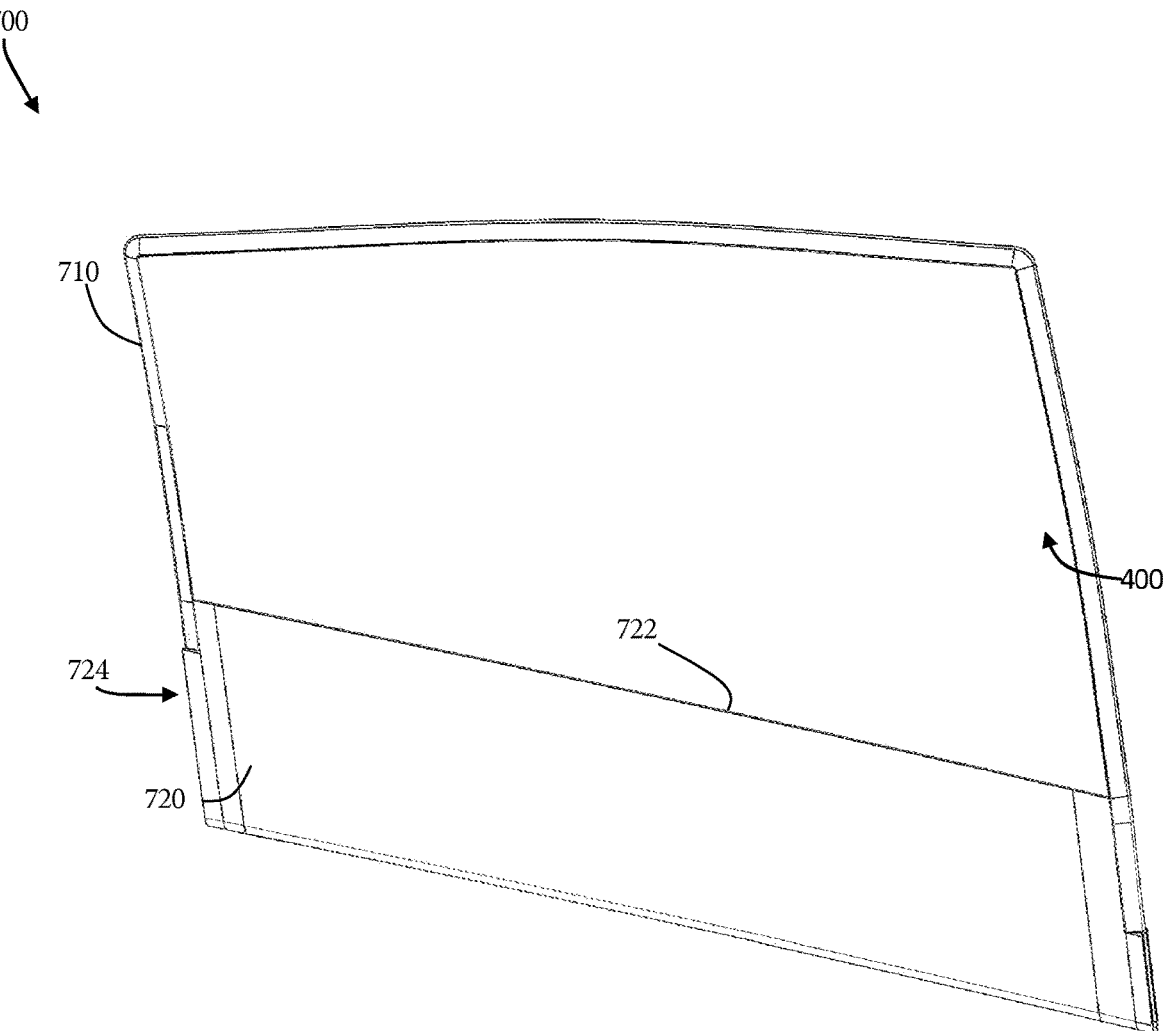
FIG. 7 schematically depicts a perspective view of a stack of glass plies inserted into a vacuum ring, according to one or more embodiments of the present disclosure.
Figure 8:
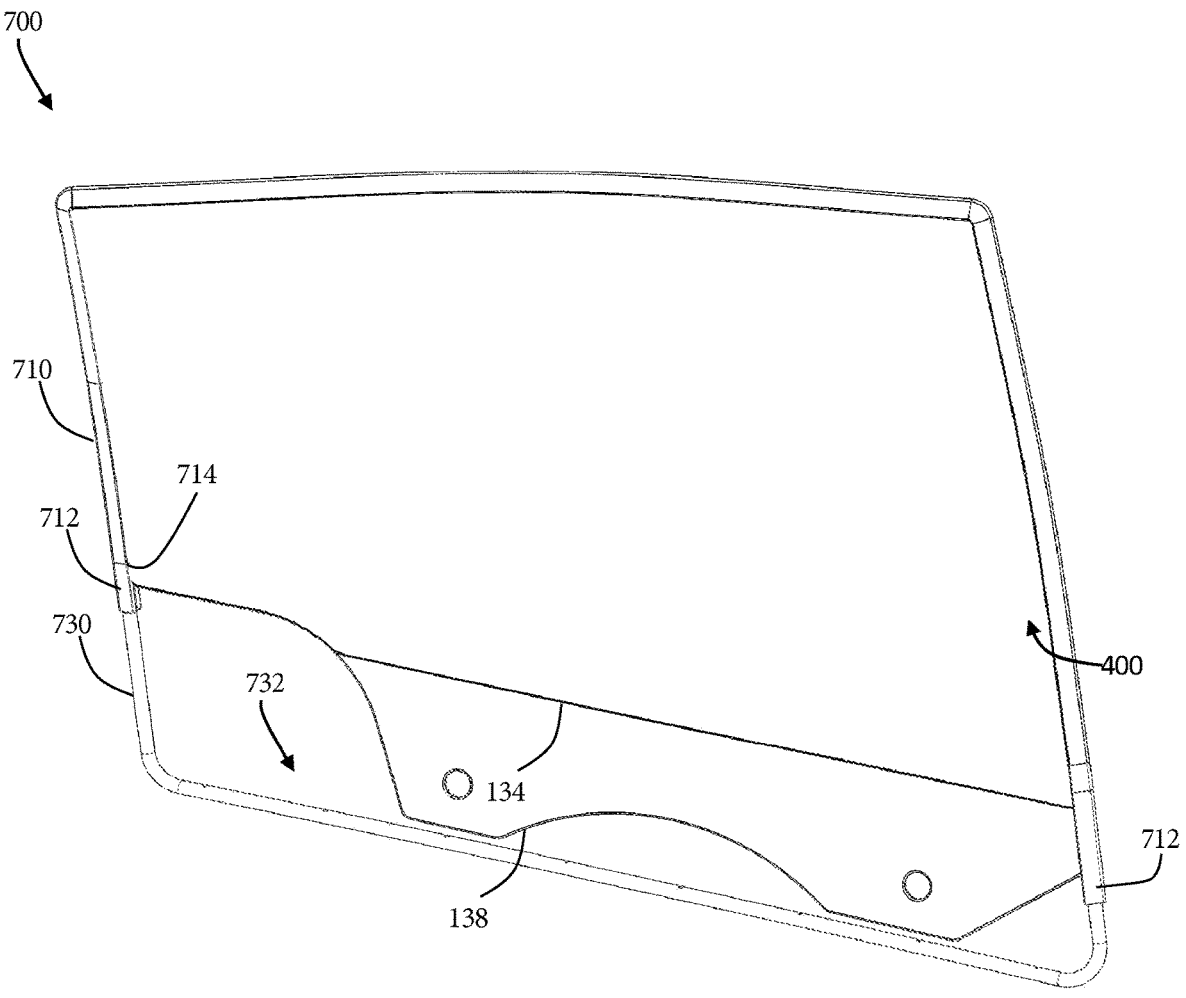
FIG. 8 schematically depicts the stack and vacuum ring of FIG. 7, with a second portion of the vacuum ring being removed to depict a vacuum distributor, according to one or more embodiments of the present disclosure.

FIGS. 7 and 8 schematically depict the stack 400 described herein inserted into a vacuum ring 700. FIG. As shown in FIG. 7, the vacuum ring 700 comprises a first portion 710 where a vacuum channel has a first depth to accommodate the portion of the stack 400 where peripheral edges of the first and second glass plies 200 and 220 are generally in alignment and a second portion 720 where the vacuum channel has a second depth that is greater than the first depth to accommodate the extending portion 138 described herein. The second portion 720 is removed from FIG. 8 for the purposes of explanation herein. In the depicted embodiment, the first portion 710 is segments of vacuum ring that are attached to one another to form a shape that corresponds to that of the of the first portion 142 described herein where the peripheral edges of the stack 400 are generally in alignment.

As shown in FIG. 8, in the depicted example, the extending portion 138 of the first glass ply 200 (see FIGS. 5A-5B) is a portion of the first glass ply 200 that extends outward from the bottom edge 134 of the second glass play 220 along the bottom edge of the stack 400. The first portion 710 includes extensions 712 that do not contain the stack 400. That is, the extensions 712 extend beyond the corners of the portion of the stack 400 containing overlapping outer edges. Put differently, within the extensions 712, the vacuum channel is devoid of glass material making up the stack 400. The extensions 712 being devoid of glass material allows space for insertion of a vacuum distributor 730. The vacuum distributor 730 is generally a conduit facilitating the transfer of fluid between the portions of the vacuum channel defined first and second portions 710 and 720. To this end, the vacuum distributor 730 can enclose a vacuum cavity and generally extend along the periphery of the stack 400 between the extensions 712 such that that a first end of the vacuum distributor 730 is inserted into a first one of the extensions 712 and a second end of the vacuum distributor 730 is inserted into a second one of the extensions 712. The vacuum cavity formed by the vacuum distributor 730 thus ensures a continuous pathway for the distribution of vacuum pressure throughout the vacuum channel despite the vacuum channel being formed from different bodies of material that make up the first and second portion 710 and 720.

The vacuum distributor 730 can be a tube of suitable material (e.g., rubber) that is capable of forming a seal with the first portion 710 when ends thereof are inserted into the vacuum channel of the first portion 710. The vacuum distributor 730 includes a plurality of openings 732 distributed throughout and facing the stack 400. In embodiments, the plurality of openings 732 are evenly distributed along a bottom edge of the vacuum distributor 730, with the bottom edge being a linear segment of tubing. It is found that such a uniform distribution of openings along a linear segment facilitates providing a uniform distribution of vacuum pressure to the vacuum channel in the second portion 720 (see FIG. 7).

In the example depicted in FIG. 7, the second portion 720 is a rubber pouch that is secured to an outer surface of the first portion 710 (e.g., via a suitable adhesive or heat sealing) and around the vacuum distributor 730. Thus, not only does the vacuum distributor 730 facilitate distributing vacuum pressure throughout the vacuum channel, but it also provides a framework to form the pouch that makes up the second portion 720. The vacuum distributor 730 provides structural support to the second portion 720 while also facilitating the operation of the entire vacuum ring 710 by ensuring fluid communication throughout the vacuum channel.

As shown in FIG. 7, an upper edge 722 of the second portion 720 is secured to the first portion 710 at a position above the bottom edge 134 (as indicated by the upper line 714 in FIG. 8) so that both of the glass plies are secured within the portion of the vacuum channel defined by the second portion 720. The rubber pouch can be a sheet of rubber material that is bonded to the outside of the first portion 710 using any suitable technique capable of forming a vacuum tight seal. Outer edges 724 of the pouch can be sealed by joining the edges of the pouch (e.g., via adhesive or heat sealing) or by adding additional material so that the second portion 722 defines a closed cavity once the stack 400 is inserted into the cavity.

It has been found that providing adequate vacuum pressure within the second portion 720 is difficult given its size and lack of vacuum ports 336 in the depicted embodiment. The construction shown in FIGS. 7-8, with the vacuum distributor 730 enables a relatively low cost and efficient construction of a vacuum ring with a variable vacuum depth adapted for laminating differently sized glass plies. Generally, segments of vacuum ring including a vacuum channel of a first relatively small depth can be provided and arranged along a path where the plies in the stack have overlapping edges. These segments of vacuum ring can then be attached with one or more vacuum distributors to facilitate distributing the vacuum pressure from any vacuum ports that may be present in the vacuum ring. These segments of vacuum ring can then be attached to one another by forming one or more pouches of a suitable material around the vacuum distributor. The one or more pouches can be constructed to have suitable depths to accommodate for any offsets between the edges of the plies.

As used herein, the term "dispose" comprises coating, depositing and/or forming a material onto a surface using any known method in the art. The disposed material may constitute a layer, as defined herein. The phrase "disposed on" comprises the instance of forming a material onto a surface such that the material is in direct contact with the surface and also comprises the instance where the material is formed on a surface, with one or more intervening material(s) between the disposed material and the surface. The intervening material(s) may constitute a layer, as defined herein.

Ranges can be expressed herein as from "about" one particular value, and/or to "about" another particular value. When such a range is expressed, another embodiment comprises from the one particular value and/or to the other particular value (i.e., the range is inclusive of the expressly stated endpoints). Similarly, when values are expressed as approximations, by use of the antecedent "about," it will be understood that the particular value forms another embodiment. For example, the range "from about 1 to about 2" also expressly comprises the range "from 1 to 2". Similarly, the range "about 1 to about 2" also expressly comprises the range of "1 to 2". It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, comprising: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" comprise plural referents unless the context clearly dictates otherwise. Thus, for example, reference to "a" component comprises aspects having two or more such components, unless the context clearly indicates otherwise.

Construction and arrangements of the compositions, assemblies, and structures, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. Materials, such as the glazing disclosed herein, may be used for glazing in architectural applications (e.g., windows, partitions) or may be otherwise used, such as in packaging (e.g., containers). The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A process for fabricating a glass laminate, the process comprising:

positioning a second glass substrate onto a first glass substrate with a polymeric material between the first glass substrate and the second glass substrate to form a stack, wherein the first glass substrate comprises a greater surface area than the second glass substrate such that the first substrate comprises an extending portion that is not covered by the second glass substrate and an edge of the first glass substrate is offset from an edge of the second glass substrate by a distance that is greater than or equal to 10 mm;

inserting an entirety of a periphery of the stack into a vacuum channel of a vacuum ring, wherein the vacuum ring comprises a first portion where the vacuum channel has a first depth and a second portion where the vacuum channel has a second depth that is greater than or equal to twice the first depth, wherein an entirety of the extending portion is contained in the second portion of the vacuum ring;

applying negative pressure to the vacuum channel; and heating the stack to above a softening temperature of the polymer material to bond the first glass substrate to the second glass substrate such that the second glass substrate is retained in a bent shape by the first glass substrate and the polymer material.

2. The process of claim 1, wherein the distance that the edge of the first glass substrate is offset from the edge of the second glass substrate varies as a function of position within the stack.

3. The process of claim 1, wherein the distance comprises a maximum value that is greater than or equal to 100 mm.

4. The process of claim 3, wherein the second depth is greater than or equal to 100 mm.

5. The process of claim 1, wherein, within the second portion, the second depth has a constant value.

6. The process of claim 1, wherein:

the periphery comprises an aligned portion where three edges of the second glass substrate are aligned with three corresponding edges of the first glass substrate, and the first portion of the vacuum ring encapsulates an entirety of the aligned portion of the periphery.

7. The process of claim 1, wherein the vacuum channel comprises a constant width measured in a direction perpendicular to the depth.

8. The process of claim 7, wherein the constant width is less than or equal to a total thickness of the glass laminate.

9. The process of claim 1, further comprising applying a force to the stack to press the first glass substrate against the second glass substrate, wherein applying the force comprises contacting the second glass substrate with a pressing member to press the second glass substrate against the first glass substrate.

10. The process of claim 1, wherein the extending portion comprises one or more openings.

11. The process of claim 1, wherein the first glass substrate is curved, and, when the stack is formed, the second glass substrate comprises a minimum radius of curvature that is greater than that of the first glass substrate, wherein applying the negative pressure causes the second glass substrate to bend.

* * * * *